United States Patent [19]

Cummings

[11] 4,185,456

[45] Jan. 29, 1980

[54] PROVIDING ENERGY FROM THE COMBUSTION OF METHANOL

[76] Inventor: Donald R. Cummings, Anchor Cottage, Coln St. Dennis, Cheltenham, Gloucestershire, England

[21] Appl. No.: 810,389

[22] Filed: Jun. 27, 1977

[30] Foreign Application Priority Data

Jul. 2, 1976 [GB] United Kingdom ............... 27712/76
Jul. 2, 1976 [GB] United Kingdom ............... 27713/76
Jul. 2, 1976 [GB] United Kingdom ............... 27714/76
Apr. 19, 1977 [GB] United Kingdom ............... 16207/77

[51] Int. Cl.$^2$ .............................................. F02C 3/22
[52] U.S. Cl. .................................. 60/39.02; 60/39.12; 48/197 R
[58] Field of Search ............ 60/39.02, 39.12, 39.46 R, 60/39.46 G; 123/1 A; 423/246, 248; 48/197 R

[56] References Cited

U.S. PATENT DOCUMENTS

3,167,913  2/1965  Muhlberg et al. .................. 60/39.02
3,986,350  10/1976  Schmidt ........................ 60/39.46 R
4,046,522  9/1977  Chen et al. ........................ 48/197 R

FOREIGN PATENT DOCUMENTS

2550306  4/1976  Fed. Rep. of Germany .......... 123/1 A

Primary Examiner—Louis J. Casaregola
Attorney, Agent, or Firm—Browdy and Neimark

[57] ABSTRACT

The efficiency of a methanol-fueled gas turbine is improved by at least partially dissociating the methanol prior to combustion in the presence of a methanol dissociation catalyst and providing at least a part and preferably all of the energy for the dissociation from the heat in the hot gases of combustion. This heat is sufficient to dissociate more of the methanol than is required for the combustion so that a process gas containing carbon monoxide and hydrogen is available from the process as well as power from the turbine. Self-contained processes for the production of liquid hydrogen, for the production of steel from iron ore and for the conjoint production of electrical power and methane gas are described.

15 Claims, 6 Drawing Figures

PROVIDING ENERGY FROM THE COMBUSTION OF METHANOL

This invention relates to obtaining improved performance from gas turbines fueled from methanol and in preferred embodiments also provides a gas-turbine powered process for the production of a process or fuel gas from methanol and a gas-turbine powered process for the production of a process gas from methanol and its subsequent use in an energy process such as the production and liquefaction of hydrogen or the production of a reducing gas and its subsequent use in the production of metals by direct reduction. In terms of energy requirements, these processes can be made fully self-contained.

For many years, it has been recognized that the transformation of remote or difficult-to-transport fuel reserves, especially gas reserves, into methanol may resolve transportation and utilization difficulties.

The transportation of methanol offers considerably advantages over the transportation of natural gas in that inter alia more energy can be transported as methanol than as natural gas in a pipe of given diameter and also, as methanol is a liquid at all normal ambient temperatures, including arctic temperatures, it can readily be stored and moved by conventional sea, road and rail tankers.

Another advantage of methanol is that it can readily be produced from low grade carboniferous fuels such as a lignite, low grade coals, heavy oils and waste hydrocarbons, and offers a ready means of transporting and utilizing the energy values of these fuels.

Thus, considerable effort has been expended in the examination of the large scale production of methanol and its use as a fuel and in particular its use as an alternative to liquid hydrocarbon fuels, e.g. as reported in the paper presented by R. K. Pefley et al at the 1971 Intersociety Energy Conference Proceedings and reprinted by the Society of Automotive Engineers Inc at pages 36 to 45, Paper No. 719008, in August 1971.

It is well known that at elevated temperatures methanol dissociates to carbon monoxide and hydrogen in accordance with the following equation $$CH_3OH \rightleftharpoons CO + 2H_2$$

It is also well known that the dissociation can be assisted by catalysts and catalysts for this dissociation are also well known.

The gas when fully dissociated has a calorific value about 20% greater than undissociated methanol, resulting from the energy of about 2400 BTU/lb absorbed by vaporizing, superheating and dissociating the methanol.

Recognising this, Pefley et al also experimented with the use of partially and fully dissociated methanol as a fuel in a spark ignition engine and examined the possibility of providing the energy for the dissociation from the heat in the engine exhaust gases.

The reported results, however, were not encouraging. Although substantial dissociation can be obtained at relatively low temperatures, e.g. 300°–400° C., in the presence of suitable catalysts and although the engine exhaust gases are available at about 500°–550° C., it waas calculated that some ten superheating stages alternating with ten dissociation stages would be required to obtain as little as 30% dissociation.

Moreover, the reported results also showed that the potential benefit of the higher calorific value of the dissociated material was almost entirely offset by a significant reduction in the thermal efficiency of the engine. Also, the engine power output was only about 80% that using the undissociated methanol.

In any event, in recent years, the art appears to have turned away from the possibility of using dissociated methanol as a fuel.

I have now found, however, that the loss in thermal efficiency observed by Pefley et al does not occur if the engine is a gas turbine engine and indeed it is possible, providing combustor conditions and recirculation rates are modified to allow for the revised nature of the fuel, to obtain an increase in efficiency. Although it is to be understood that the present invention is not to be bound by any particular theory to explain this phenomenon, I believe that this is because during the compression of the air-fuel mixture containing the dissociated methanol in the cylinder of a reciprocating engine, deleterious reactions such as methanation probably occur with premature release of energy prior to combustion, since carbon monoxide and hydrogen in the mixture can react together to form methane as follows $$CO + 3H_2 \rightarrow CH_4 + H_2O + heat$$

Under the conditions present in the inlet to the gas turbine engine, on the other hand, because the compression of the air and the fuel are separate, the fuel is not subjected to the compression conditions of a reciprocation engine and even if methanation were to occur in a gas turbine before or in the combustion chamber, the exothermic reaction does not affect the engine efficiency as in the case of a conventionally operated reciprocating engine.

I have also found that although the temperature of the exhaust gases from a gas turbine fueled by dissociated methanol is substantially below that of the exhaust gases of a reciprocating engine, the amount of useful energy in these gases is more than enough to dissociate the methanol. By way of example, a gas turbine of 33% thermal efficiency running on 95% dissociated methanol produces 34 lb/lb, of fuel consumed by exhaust gases at about 450° C. and with a sensible heat of about 6950 BTU/lb and an average specific heat of about 0.265. The energy required to heat liquid methanol from ambient temperature to, for example, about 400° C. and 95% dissociate it is about 2060 BTU/lb. This can readily be provided from the exhaust gases by indirect countercurrent heat exchange. The required drop in exhaust gas temperature is only about 127° C.

I have further found that the dissociation can be achieved very simply and effectively using the energy in these exhaust gases by passing vaporized and superheated methanol through catalyst filled tubes the surfaces of which are exposed to the exhaust gases. The initial vaporization and superheating of the methanol for subsequent dissociation may also be achieved by simply indirect heat exchange with the exhaust gases.

While the benefit is efficiency is maximized by dissociating the methanol, a useful efficiency increase is also obtainable simply from vaporizing the methanol prior to combustion in the gas turbine.

According to the present invention, therefore, there is provided a method of producing power by the combustion of methanol-containing fuel in a gas turbine, in which method the methanol is vaporized prior to combustion and energy for the vaporization is provided from the heat in the hot gases of combustion.

Most preferably, prior to combustion the methanol is at least partially dissociated at elevated temperature and in the presence of a catalyst for the dissociation, and energy for the dissociation is provided from the heat in the hot gases of combustion.

By both vaporizing and at least partially dissociating the methanol, the potential energy in the methanol fuel is maximized, the greatest value being achieved with the higher degrees of dissociation.

Whereas methanol is vaporized fully (i.e. boils) at about 65° C. at atmospheric pressure, measurable dissociation requires considerably higher temperatures, e.g. of 230° C. or more, and further increasing the temperature increases dissociation. Thus, where both vaporization and dissociation are desired, hot gas from the combustion may first be used to promote dissociation of previously vaporized methanol and then residual heat in the stream of fuel gas may be utilized to vaporize more methanol for subsequent dissociation. Alternatively, one portion of the exhaust gas from the combustion may be used to promote dissociation of the methanol and another, smaller, portion used to vaporize the methanol.

It is possible to operate the invention so that only part of the exhaust gas is employed in vaporizing, heating and dissociating the methanol, leaving another part which may be used for process heating, steam raising, etc.

The dissociation is effected in the presence of a suitable catalyst. As a general rule, those catalysts known to promote the synthesis of methanol from carbon monoxide and hydrogen are also able to promote the dissociation of the methanol to carbon monoxide and hydrogen at elevated temperatures. One suitable catalyst is a mixture of the oxides of zinc and chromium, optionally doped with oxide of copper. Other suitable catalysts are known in the art.

Dissociation is encouraged by increasing temperature and decreasing pressure. However, the maximum temperature is determined inter alia by the nature of the catalyst since the catalysts tend to become deactivated if overheated for prolonged periods. Some catalysts may be used at temperatures up to about 400° C. but others, e.g. catalysts containing copper, are preferably not exposed to temperatures above 300° C. As dissociation is only slow below about 200° C., preferred temperatures are 200° to 300° C. for copper-containing catalysts and 300° to 400° C. for the high temperature catalysts.

The vaporization and at least partial dissociation of the methanol improves the heating value of the methanol and its flame speed and lower lean flammability limit and thus improves the efficiency of a gas turbine utilising this fuel. In the preferred case where the total heat requirement for the vaporization and dissociation of the methanol it met from the heat of the hot exhaust gases, the efficiency increase is net and can be as much as 20% or even more.

In accordance with one particularly important aspect of the invention, it has been found that the available heat in the hot gases of combustion substantially exceeds that required to provide the energy for the dissociation and the excess heat may usefully be employed in vaporizing and dissociating additional methanol so that the process may export not only power from the gas turbine and possibly excess heat in the exhaust gases for other processing but also a process or fuel gas containing carbon monoxide and hydrogen. For example, as much as 1.8 lbs of methanol can be dissociated to 95% for each lb of the dissociated methanol required as fuel. Thus, a substantial proportion of the calorific value of the dissociated methanol can be made available as a process or fuel gas.

Thus, in accordance with this aspect of the invention, there is provided a method of providing both power and a process of fuel gas from methanol, the method comprising vaporizing and at least partially dissociating the methanol at elevated temperature and in the presence of a catalyst for the dissociation to form carbon monoxide and hydrogen, energy for the dissociation being provided from the heat in the hot gases of combustion from a gas turbine fulled by a first gas provided from the vaporized and at least partially dissociated methanol, a second gas provided from said vaporized and at least partially dissociated methanol providing said process or fuel gas.

The available heat in the hot gases of combustion from the turbine can be used to provide all the energy for the dissociation and thus by means of this embodiment of the invention a self-contained unit can be provided for the supply of power and a valuable process gas containing carbon monoxide and hydrogen.

In a gas turbine, it is usual to supply air in an amount substantially in excess of that required to burn the fuel. One reason for this is to moderate the temperature seen by the turbine blades. In another preferred embodiment of this invention, unused oxygen in the hot gases from the turbine is employed to combust additional fuel, which conveniently but not necessarily is methanol or is supplied from the at leat partially dissociated methanol. The additional energy thus obtained is reflected in part by a temperature increase in the exhaust gases and may also be converted in part into mechanical energy e.g. in the final power turbine of a split shaft turbine. This arrangement provides greater flexibility in the ratio of thermal and mehanical energy available from the process and thus the ratio of exportable power to the quantity of process or fuel gas available net from the process may be varied.

In particular, the heat available for dissociation of the methanol can be increased without the need for increasing the provision of combustion air. Burning the excess air before rather than after the final power turbine gives a higher overall efficiency and either is more efficient than combusting more fuel with more air to provide the necessary heat.

The fuel for the gas turbine and the process or fuel gas for export may be derived from the at least partially dissociated methanol by, for example, dividing the latter into two streams. Alternatively, all or a portion of the at least partially dissociated methanol may be separated in known manner into one or more carbon monoxide-rich streams and one or more hydrogen-rich streams. Thus, the fuel for the turbine and which is provided from the dissociated methanol may comprise a stream divided from the dissociated methanol before the latter is subjected to the separation, or it may be derived from one or more of the carbon monoxide rich and/or hydrogen rich streams resulting from the separation or it may be formed by a combination of (a) a stream divided from the dissociated methanol and (b) at least one stream divided from the streams resulting from the separation. The some choices are available for the exported process or fuel gas. Thus, for example, the dissociated methanol may be divided into three streams one of which is subjected to separation, the separated portions being separately blended with the other two streams, thus providing two streams of controllable composition each of which, for example, may be used as a turbine fuel. If the division is into more than three streams with one or more of these streams being separated, an improved range of gas flows and compositions is available.

Whereas all the energy for separation may be provided by other means suc as a conventionally fueled prime mover, in a preferred embodiment at least some of this energy is provided by combustion of a fuel provided from the at least partially dissociated methanol, for example in the form of heat energy and/or in the form of mechanical energy by combusting the fuel in one or more prime movers. The fuel may be dissociated methanol which has not been subjected to separation and/or one or more of the streams from the separation. Conveniently, the gas turbine may provide the mechanical energy but this turbine may be used in combination with one or more other prime movers.

By suitable choice of the proportion of the dissociated methanol employed to supply the fuel (before or after separation) and the proportion that is separated, it is possible to provide all the energy for the separation from the combustion of the fuel, thereby providing a fully self-contained process.

The separation may be effected in well-known manner by, for example, adsorption, in which case the energy may be required as power for compressing and/or as heat for heating the gas stream for subsequent treatment by e.g. pressure swing adsorption or thermal swing adsorption. Preferably, however, the separation is effected at least mainly by partial condensation at cryogenic temperatures in accordance with well-known techniques, in which case the energy for the separation is suitably supplied as mechanical energy compressing the at least partially dissociated methanol to the pressure required for the attainment of the required cryogenic temperatures by subsequent work expansion of the compressed stream. The required pressure may be achieved by compressing the methanol prior to dissociation or by compressing the dissociated methanol.

The separation may be conducted to provide hydrogen and the invention can thus provide a self-contained process for the generation of hydrogen and energy from a readily transportable fuel, i.e. methanol. The purity desired in the hydrogen stream will determine the degree of separation that is to be achieved. Where high degrees of purity are desired, a combination of known techniques such as adsorption, absorption, cryogenic condensation and cryogenic distillation may be required.

In a further aspect of the invention, the second gas from the separation is employed in an energy consuming process and energy for the process is provided by combustion of a fuel provided from the at least partially dissociated methanol. The energy may be provided as heat and/or as mechanical energy by combusting the fuel in one or more prime movers, for example the gas turbine, alone or together with one or more other prime movers.

For example, the second gas may comprise a hydrogen stream and this may be liquefied, some and preferably all of the energy for the liquefaction being provided in the manner described above. Preferably, the fuel will be provided as a stream divided from the dissociation methanol before separation. Alternatively or additionally, the fuel may be provided from carbon monoxide-rich gas obtained from the separation. If the separation is a multi-stage separation, the fuel may be provided, for example, from the carbon monoxide-rich gas obtained from one or more of the separation stages.

In this embodiment, a plurality of prime movers may be used, e.g. one to provide power for the separation and one to provide power for liquefaction. These prime movers may be fueled from the same or different sources; for example at least one of them may be fueled by at least partially dissociated methanol and at least another may be fueled by carbon monoxide-rich gas from the separation.

A portion of the hydrogen recovered from the separation may also be used as fuel although this reduces the net amount of hydrogen available from the process.

It will be appreciated that by controlling, for example, the ratio of the portion of at least partially dissociated methanol this is provided as fuel and the portion that is used as hydrogen source, not only may the total energy requirements for both the separation and subsequent liquefaction step be provided by combustion of the first mentioned portion but additional energy may be made available for other purposes, if desired.

In an alternative embodiment, the second gas may be used, for example, in a chemical or metallurgical process, e.g. as a reducing gas. In particular, the second gas may suitably be employed in the production of a metal or an alloy of said metal by a process which includes direct reduction of a chemical compound containing the metal, in particular an oxide of the metal. Examples of such processes include the production of zinc, copper and lead from their respective oxides which may in turn be derived, for example, by roasting the naturally occurring sulphides.

One industrial process for which the present invention is particularly suitable is the production of metals from metalliferous ores by a route which involves the direct reduction of the ore, or a chemically altered derivative of the ore, and the subsequent treatment of the crude metal so produced in an arc furnace for further refinement. Examples of this process are the production of steel from iron ore and the production of copper from copper oxide.

In each case, the reduction of the ore may be effected by the gas obtained from the dissociation of the methanol, or more preferably from hydrogen derived from this gas. Hydrogen is a much preferred reductant in the reduction of metal ores because in general in such reductions it is necessary to provide considerably more reductant than is required stoichiometrically for the reduction of the ore and it is therefore economically desirable to recycle the unused reductant. Where hydrogen is the reductant, the principal oxidation product is water which can be readily removed from the hydrogen recovered from the reduction zone thereby avoiding the need for a large purge from the recycle stream. On the other hand, where carbon-containing reductants are used, the principle oxidation products are oxides of carbon which are more difficult to remove, especially in the case of the dioxide. A further advantage of using hydrogen is that the danger of undesirable methanation by reaction with carbon monoxide can be reduced or avoided by employing a substantially pure stream.

It is thus an advantage of the present invention as applied to an ore reducing process that the hydrogen can be produced in a substantially dry state with at most only trace amounts of water and carbon oxide contaminants, particularly where the separation is by cryogenic partial condensation.

It has been found in particular that by means of the invention a substantially self-contained plant employing methanol fuel can be provided which, for example, can provide all the reducing gas requirements and all the power requirements for the production of rolled steel goods from iron ore, no additional power utilities being required.

In accordance with yet another embodiment of the invention, the separation may be so conducted as to yield as one of the streams resulting from the separation a gas containing carbon monoxide and hydrogen in a molar ratio which is suitable for the subsequent formation of methane by the reaction of the carbon monoxide and hydrogen. As an alternative, a stream having the desired ratio may be obtained by combining at least one stream derived from the carbon monoxide-rich and hydrogen-rich streams resulting from the separation with a stream withdrawn from the dissociated methanol stream prior to separation and/or with at least one other stream selected from said carbon monoxide-rich and hydrogen-rich streams. A suitable ratio is about one mole of carbon monoxide to three moles of hydrogen whereby methanation may be effected in accordance with the following equation $$CO + 3H_2 \rightarrow CH_4 + H_2O$$

The methanation may be carried out in accordance with known techniques using standard methanation conditions and known methanation catalysts.

If the gas turbine is employed to drive a generator, this embodiment of the invention can be used to prvide a self-contained unit for the production of electrical power and methane gas. The unit may be employed, for example, to provide stand-by capacity for use during peak electricity and gas comsunption periods.

The invention is now illustrated in greater detail with reference to some preferred embodiments and with the aid of the accompanying drawings in which FIG. 1 is a block diagram of a gas turbine modified to operate in accordance with the invention and with provision for also supplying carbon monoxide-rich and hydrogen-rich process gases;

Figure 1:
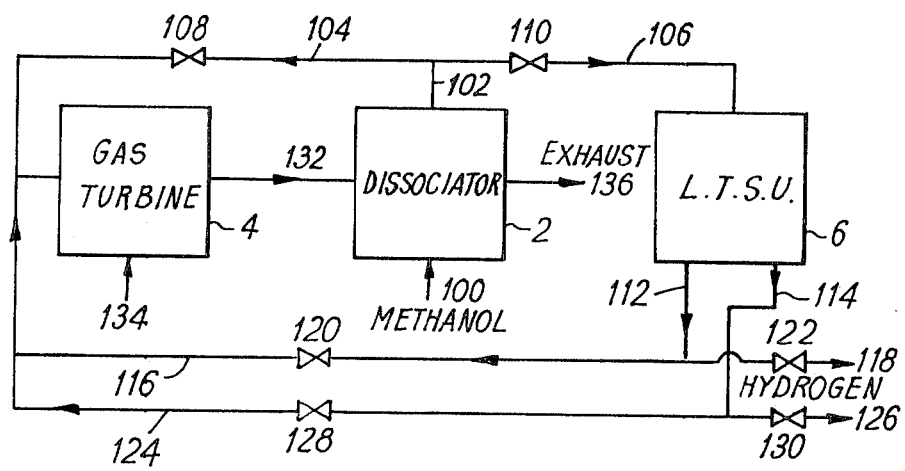
Figure 2:
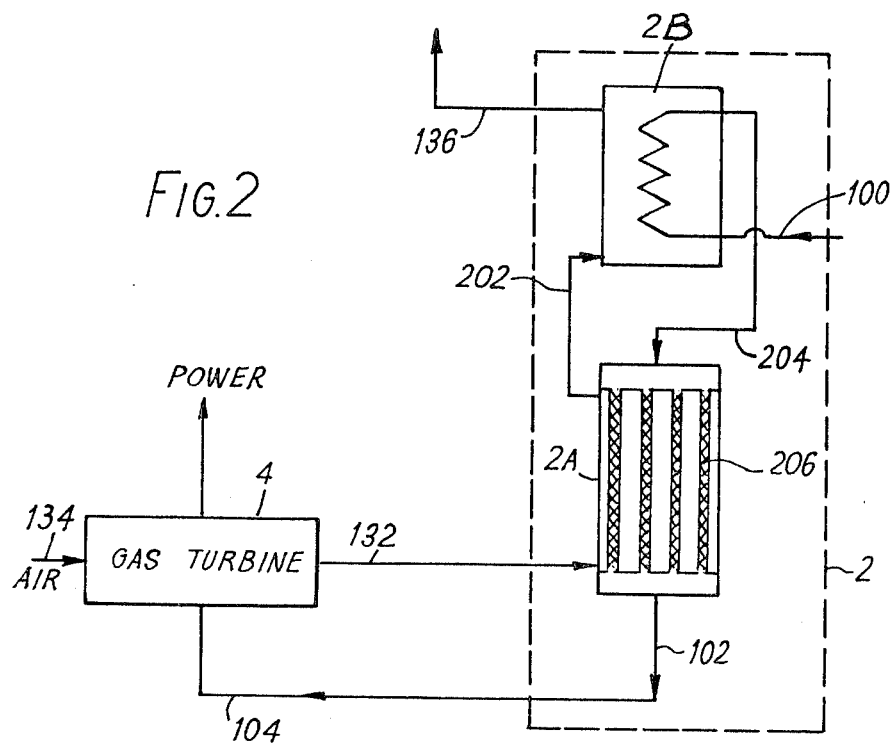
FIG. 2 shows use of the invention to increase turbine efficiency and also one preferred arrangement of the methanol dissociator employed in FIG. 1.

Referring to FIGS. 1 and 2 of the drawings, 2 represents a dissociator in which the methanol is evaporated, superheated and dissociated, 4 is a gas turbine and 6 is an optional low temperature separator unit.

Liquid methanol is fed to the plant through pipeline 100 and is passed through dissociator 2 in which it is vaporized, superheated and at least partially dissociated into carbon monoxide and hydrogen. As shown in FIG. 2, the dissociator 2 comprises a pair of heat exchangers 2A and 2B. 2B is a vaporizer and superheater and 2A is a dissociator for the methanol and contains tubes 206 through which the methanol is passed and which are packed with catalyst material for promoting the dissociation of the methanol. By way of example, each catalyst-filled tube may comprise a 20 ft length of 2 inch corrosion resultant Cr/Mo alloy steel. The first 8 ft of the tube at the high temperature end of the exchanger is packed with $\frac{1}{4}$ inch cylindrical zinc-based methanol dissociation catalyst e.g. as available from Wentworth Bros of Cincinatti, Ohio, U.S.A. and the remaining 12 ft length of the tube filled with low temperature copper and zinc-based catalyst such as ICI catalyst 51 available from Imperial Chemical Industries Limited, London, England. Methanol can be dissociated to at least 95% dissociation under suitable temperature conditions e.g. as given in Example 1 below, during passage through this tube at a rate of 12.5 lb/hr.

The liquid methanol at ambient temperature passes first to the evaporator/superheater 2B where it is evaporated and superheated and thence via pipeline 204 to dissociator 2B where it is passed through the catalyst packed tubes 206 and is largely dissociated to carbon monoxide and hydrogen.

In the simplest case, illustrated in FIG. 2, all the dissociated methanol recovered from dissociator 2A, suitably about 95% dissociated, is passed via pipeline 104 to the inlet to the gas turbine where it is combusted with air supplied through pipeline 134. The exhaust gases from the turbine are recovered in pipeline 132 and fed first to dissociator 2B where they are passed through the shell in countercurrent indirect heat exchange relationship with the stream passing through the catalyst packed tubes 206 to provide the heat for the endothermic dissociation. The thus-cooled exhaust gases are then recovered from the dissociator and passed via pipeline 202 to evaporator/superheater 2B where they vaporize and superheat the methanol in pipeline 100 for passage to the dissociator. The exhaust gases recovered from evaporator/superheater 2B are then exhausted to atmosphere through pipeline 136.

By means of this arrangement, all the energy for dissociating the methanol fuel for the gas turbine is provided from the heat in the hot exhaust gases and the efficiency of the turbine (net power per unit of fuel consumed per hour), based on net calorific values, can be increased by, for example, as much as 20% or even more.

In fact, as stated above, the energy available in the hot exhaust gases is substantially in excess of that required to dissociate the methanol required to fuel the gas turbine and in one improved embodiment, this exesss energy can be employed to dissociate more methanol. This modification is illustrated in FIG. 1 in which the units and pipelines common to the arrangement of FIG. 2 have been accorded the same reference numerals.

In the arrangement of FIG. 1, however, the pipeline 102 in which the dissociated methanol is recovered from dissociator 2 is connected to two pipelines 104 and 106, each being fitted with a valve 108, 100 respectively. Pipeline 106 leads to a low temperature unit represented diagrammatically at 6 where dissociated gas in pipeline 106 is separated by means of known techniques into a carbon monoxide-rich stream which is recovered through line 112 and a hydrogen-rich stream which is recovered through line 114. Line 112 feeds two pipelines 116 and 118 via valves 120 and 122. Line 114 feeds two pipelines 124 and 126 via valves 128 and 130.

Carbon monoxide-rich gas can be recovered from the plant in pipeline 118 and hydrogen-rich gas can be recovered in pipeline 126. Also, as pipelines 104, 116 and 124 are connected to the fuel inlet to gas turbine 4, the gas turbine may be fueled by a part of the dissociated methanol stream recovered from the dissociator 2 in pipeline 102 or by some or all of the carbon monoxide-rich gas from the separator, or by some or all of the hydrogen-rich gas from the separator. Combinations of these alternatives are also possible. Thus, the plant can be arranged to supply carbon monoxide rich gas and/or hydrogen rich gas as a process gas as well as supplying power from the turbine 4.

Gas turbine 4 can, if desired, provide the power requirements for the separation of the gases in low temperature separator unit 6 as well as supplying power for other purposes, e.g. electricity generation. The power required for the separation will normally be only a very small fraction of the total power available from the turbine.

It will also be understood that gas turbine 4 may, if desired, be replaced by several gas turbines.

An adaptation of the arrangement generally illustrated in FIG. 1 to produce liquid hydrogen from hydrogen-rich gas produced in the low temperature separator unit 6 is now described with reference to FIG. 3 in which the units common to the arrangement of FIG. 1 have the same reference numerals. Thus, 2 is a methanol dissociator, 3 is a combustion engine driven power generator means shown in this instance as comprising three gas turbine high pressure gas generators 4a, three exhaust gas re-heat combustors 4b, and three turbines 4c driving three electricity generators 10a, 10b and 10c. The arrangement within the broken lines and designated 6 is a low temperature hydrogen/carbon monoxide separation unit and comprises a dissociated gas purification unit 12, a heat exchanger 14, a liquid/gas separator 16, a heat exchanger 18, a liquid/gas separator 20, an expansion turbine 22 and a turbine brake 24 which may be a hydrogen gas compressor or power generation unit or other suitable device. The arrangement within the broken lines and designated 26 is a hydrogen liquefaction unit comprising a gas purification unit 28, a heat exchanger 30, a low temperature gas purification unit 32, a heat exchanger/liquefier 34, an expansion turbine 36, a turbine brake 38, a hydrogen compressor 40 and driving motor 42 and an after-cooler 44. 46 is an exhaust gas re-heater for any of the turbines in item 3.

It is to be understood that the low temperature separator unit 6 and the liquefaction plant 26 are only symbolically represented but their details of construction and operation will be in accordance with well-known principles and techniques.

It is also to be understood that the low temperature separator 6 and the liquefaction plant 26 do not have to be separate units as shown in the diagram but may be integrated into a single processing unit.

Methanol is supplied to the dissociator, which may have the construction described and illustrated in FIG. 2, through pipeline 300. In the dissociator, it is heated by means described below and exposed to a catalyst of known kind whereby it is vaporised and at least partially dissociated in known manner to carbon monoxide and hydrogen, the degree of dissociation being controlled in part by the nature of the catalyst and in part by the temperature. If desired, the heating may be effected in one step or a plurality of steps, e.g. with the methanol being first vaporized and then heated in the presence of a catalyst to effect dissociation.

Dissociated gas passes via pipeline 302 to the purification unit 12 in which the gas is cooled and treated to remove any water vapor, excess methanol and carbon dioxide by any suitable means. Recovered methanol which may contain water and other impurities is discharged in pipeline 303 and may be disposed of as such or used as or as part of re-heat fuel for units 4b or 46 or as an additional fuel to the turbines 4a.

The purified gas from 12 is passed via pipeline 304 to a cryogenic separation section in which the required refrigeration is provided by expanding gas in expansion turbine 22. The gas must therefore be supplied to the section at the required elevated pressure and this may be achieved by compressing the purified gas by means, not shown, prior to feeding it to the heat exchanger 14. Alternatively, the methanol itself may be provided at a suitable elevated pressure in pipeline 300.

In heat exchanger 14, the compressed gas is cooled and some of the carbon monoxide is liquefied. The compressed gas/liquid mixture is passed to the separator 16 where the gas, depleted in carbon monoxide, is recovered and passed via pipeline 306 to the heat exchanger 18 where it is further cooled and more carbon monoxide is condensed out. The compressed gas/liquid mixture so obtained is then passed to the separator 20 where the hydrogen-rich gas at elevated pressure is withdrawn via pipeline 308 and passed back through heat exchanger 18 for re-heating prior to expansion in the expansion turbine 22. Cold low pressure hydrogen-rich gas from the expansion turbine is then passed via pipeline 310 to the exchanger 18 where it provides the necessary cold. This gas then passes through warmer heat exchanger 14 and thence to valves 312 and 316. Via valve 312, some of the hydrogen-rich gas can be withdrawn via pipeline 314 for general use in other processes etc. as required. The remainder is passed via valve 316 and pipeline 318 to the hydrogen liquefier 26.

The carbon monoxide-rich liquid from separator 16 is withdrawn through valve 320 and pipeline 332 into the gas stream in pipeline 330 from heat exchanger 18 passing to heat exchanger 14. The carbon monoxide-rich liquid from separator 20 is withdrawn via valve 324 and passed via pipeline 326 to the pipeline 330 and thence via heat exchangers 18 and 14. If desired, the carbon monoxide-rich stream in pipeline 330 may be supplemented with hydrogen-rich gas from pipe 308 via valve 328. By this means the quality and quantity of carbon monoxide-rich gas leaving the separator may be controlled, thereby providing a means of controlling the flow rate and energy content of the gas stream in pipeline 330 which may be used as hereinafter mentioned in the fueling of the gas turbine complex 4a, 4b.

Carbon monoxide-rich gas in pipeline 330 may pass via valve 332 and pipeline 334 and be withdrawn for general use in other processes etc. as required. Carbon monoxide-rich gas may also be withdrawn via pipeline 336 as fuel for the power generation unit 3, as described more fully below.

Hydrogen-rich gas in pipeline 318 passing to the liquefier 26 first passes to a purification unit 28 where the hydrogen-rich gas may be treated, by adsorption or other means, to remove at least some of the remaining carbon monoxide and any other impurities which might otherwise solidify out in the liquefaction unit. The gas in pipeline 318 may also be compressed, if required, by means not shown. The gas then passes via pipeline 352 to heat exchanger 30 where it is cooled and then passed to a low temperature purification unit 32. This treatment unit removes by adsorption, absorption or similar operations any remaining carbon monoxide and other impurities still contained in the gas which might freeze out and deposit in the low temperature heat exchanger/liquefier 34. Carbon monoxide-containing streams recovered from units 28 and 32 may be supplied as fuel to the turbine complex 3. Purified hydrogen from 32 passes via pipeline 354 to the heat exchanger/liquefier 34 and is withdrawn as liquid hydrogen. A compressed hydrogen closed loop circulation is used as liquefaction refrigerant. In this loop, compressed and cooled hydrogen is passed to the heat exchanger 30 via pipeline 362 and after being cooled therein it is passed to the expansion turbine 36 which does work on the turbine brake 38. The turbine brake 38 may be a power generator or hydrogen compressor or similar device to extract energy from the turbine 36. Cooled low pressure hydrogen from the expander 36 passes via pipeline 356 and the heat exchanger/liquefier 34 where it provides the necessary refrigeration for cooling and liquefying the hydrogen in gas stream 354. The low pressure refrigerant hydrogen in pipeline 356 is then passed from heat exchanger/liquefier 34 into the heat exchanger 30 where it is warmed before passing to the hydrogen compressor 40. Hot compressed hydrogen from the compressor 40 is passed to the after-cooler 44 which is cooled with cooling water added via pipeline 360 and the cooled compressed hydrogen is recirculated via pipeline 362.

The energy required for hydrogen liquefaction is provided mainly by the compressor motor 42 which in turn is supplied with electricity from the power generation unit 3.

The power generation unit 3 is shown as a gas turbine unit which comprises jet or high pressure gas generators 4a which are fueled via valve 348 by a portion of the dissociated methanol in pipeline 302 downstream of the dissociator 2 or via valve 340 by carbon monoxide-rich off gas which is in pipeline 336 from the separator unit 6, or by a mixture of these. The nature of the fuel supplied to each generator 4a may be the same or different. The methanol-containing stream from purification unit 12 in pipeline 303 and/or any carbon monoxide purge gas streams from units 12, 28 and 32 may also be used as fuel for these generators but will generally require repressurizing. Hot pressurized flue gas from each gas generator 4a passes via an optional re-heat burner 4b in which additional fuel may be burnt to help balance the work done by the power generation unit 3 and the heat required by the disassociator 2. In this way, the availability of liquid hydrogen, hydrogen-rich gas, carbon monoxide-rich gas and surplus power may be varied to a limited extent with the conversion of the additional fuel energy into mechanical energy in the power turbine 4c as well as into the form of an increase in temperature of the exhaust gas in the exhaust duct 164. Fuel for the re-heater 4b may be a conventional liquid or gaseous fuel or methanol added via valve 346 from pipeline 342, disassociated methanol added via valve 350 from line 302, carbon monoxide-rich gas in the form of off-gas from the separator 6 added from pipeline 336 via valve 338, or a mixture of two or more of these. Fuel values in the methanol-containing material from pipeline 303 and/or any low pressure purge gas stream obtained from any of purification units 12, 28 and 32 may also be used for this purpose.

The pressurized hot exhaust gas from each jet 4a, which may be further heated in the re-heater 4b then passes to a power expansion turbine 4c where energy is recovered as electrical energy in the generators 10a, 10b, 10c. Hot exhaust gas from the expanders passes via duct 364 and if desired a part may pass to the atmosphere or to another heat recovery device such as a boiler via valve 366 and exhaust duct 370.

In accordance with the invention, at least some of the exhaust gas passes via valve 368 and ducts 372 and 376 to the dissociator 2 where the heat in these gases is used to heat and dissociate the methanol in duct 300 by indirect heat exchange. If desired, prior to entering the dissociator 2, the exhaust gas may be passed through an optional exhaust gas re-heater 46 which may be used to further re-heat the exhaust gas and thus vary the exhaust gas temperature and the ratio of power generation to methanol dissociation. Fuel for the re-heater 46 is added via pipeline 374 and may be any liquid or gaseous fuel or any of the fuels available within the plant such as methanol, dissociated methanol or carbon monoxide-rich gas. Alternatively the unit may be fueled with low pressure purge gas streams from any of the gas purification units 12, 28 and 32, or recovered methanol from purification unit 12.

The exhaust gas from the dissociator 2 is passed to atmosphere via the exhaust duct 378.

It will be understood that many variations may be effected. For example, the electric motor 42 driving the hydrogen compressor 40 may be substituted by a direct mechanical drive link between one or more of the gas turbines 4a and the compressor 40.

The arrangement illustrated provides considerable flexibility in the provisions of power to the low temperature separator unit 6 and to the liquefaction plant 26 and in the manner in which the unit as a whole may be fueled, thereby allowing for adaptations in accordance with prevailing local conditions.

In accordance with the invention, the exhaust gas from at least one of the turbines 4a provides at least a part of the heat requirement of the dissociator but in practice it is preferred that all the heat for the dissociator is provided in this manner so that re-heater 46 is redundant.

Where there is a substantial demand for hydrogen-rich gas or carbon-monoxide-rich gas from the dissociated gas stream it will generally be preferred to increase the amount of gas available to satisfy this demand firstly by employing re-heaters 4b and secondly by employing the re-heater 46.

It will be recognized that by means of this arrangement, a substantially self-contained process may be provided for the production in situ of liquid hydrogen from a readily available, safe and easily transported and stored liquid; i.e. methanol.

If desired, the liquid hydrogen may be distilled to recover deuterium and power for the distillation may conveniently be provided by the gas turbine complex 3.

An application of the process of the invention to the production of rolled steel products will now be described with reference to FIGS. 4 and 5 of the drawings in which the units common to the arrangement of FIGS. 1 and 2 have been accorded the same reference numerals. Thus, referring to the drawings, reference numeral 2 is a methanol dissociator, 4 is a gas turbine (or plurality of gas turbines), 6 is a low temperature separator for the gas stream recovered from the dissociator, which separator may be constructed and operated in accordance with that described above with reference to FIG. 3, 50 is an ore reducer complex including a heat exchanger 66, a wash vessel 68, a preheater 70, an ore-reducing kiln 62, gas locks 60 and 64 and circulating fan 72; 52 is an arc furnace, 54 is a casting plant, 56 is a reheater, 58 is a sheet metal rolling plant and 60 is an electricity generator.

Methanol is introduced into the dissociator 2 by pipeline 402 and is vaporized and at least partially disassociated therein into carbon monoxide and hydrogen. The dissociator may be constructed as described above with reference to FIG. 2.

The total heat for the dissociation is provided by the exhaust gases from gas turbine 4, the gases being collected and passed to the dissociator in pipeline 404 and exhausting from the disassociator in pipeline 406. If desired, for reasons given above if the gas turbine is a split shaft unit it may be provided with a reheat burner or burners after or, more preferably, before final expansion in the power turbine, for example as described above with reference to the arrangement illustrated in FIG. 3.

The gas stream resulting from the dissociation, and comprising a mixture primarily of carbon monoxide, hydrogen and possibly some undissociated methanol, is recovered in pipeline 108 and passed to the low temperature separator 6.

The low temperature separator 6 is suitably constructed and arranged to operate in accordance with the unit described above with reference to FIG. 3 and employs an expansion turbine or external refrigeration plant to enable the attainment of the required cryogenic temperatures. Where these are attained by means of the expansion turbine, it will be understood that the gas stream to be separated must be supplied to the separator at elevated pressure. This may be achieved by compressing the methanol feed to the dissociator or the gas stream in pipeline 408.

The temperatures required for the separation depend primarily on the degree of separation required which in turn depends on the degree of hydrogen purity required in the hydrogen-rich stream obtained as a result of the separation. If desired, additional steps for increasing the purity of the hydrogen-rich stream may be included, such as an adsorption step. All this is well known. From the separator are recovered a hydrogen-rich stream in pipeline 410 and a carbon monoxide-rich stream in pipeline 450. Pipelines 452 and 454 and valves 456 and 458 are provided for supplying gas from this carbon monoxide rich stream as fuel to gas turbine 4 and for other use in the plant or for export as a fuel or process gas.

The hydrogen-rich stream from low temperature separator 6 is passed to an ore reducing unit generally designated by reference numeral 50 where it provides at least a part of the reducing atmosphere for reducing the iron oxides in iron ore to metallic iron in known manner. While in the process illustrated in the drawings a shaft kiln 62 is used for the reduction, other apparatus may be used, e.g. fluidized bed, fixed bed and rotary kiln reducers.

It is contemplated that the hydrogen will be introduced into the ore reducing kiln 62 in quantities in excess of those required for the reduction and to provide the heat for the endothermic reduction process and heat losses. The recovered gas, containing the excess hydrogen and also carbon oxides and nitrogen resulting from any ingress or air or inert gas, may be purged as a low grade fuel gas stream for use as a general fuel or, for example, as fuel for the reheater 56.

Figure 5:
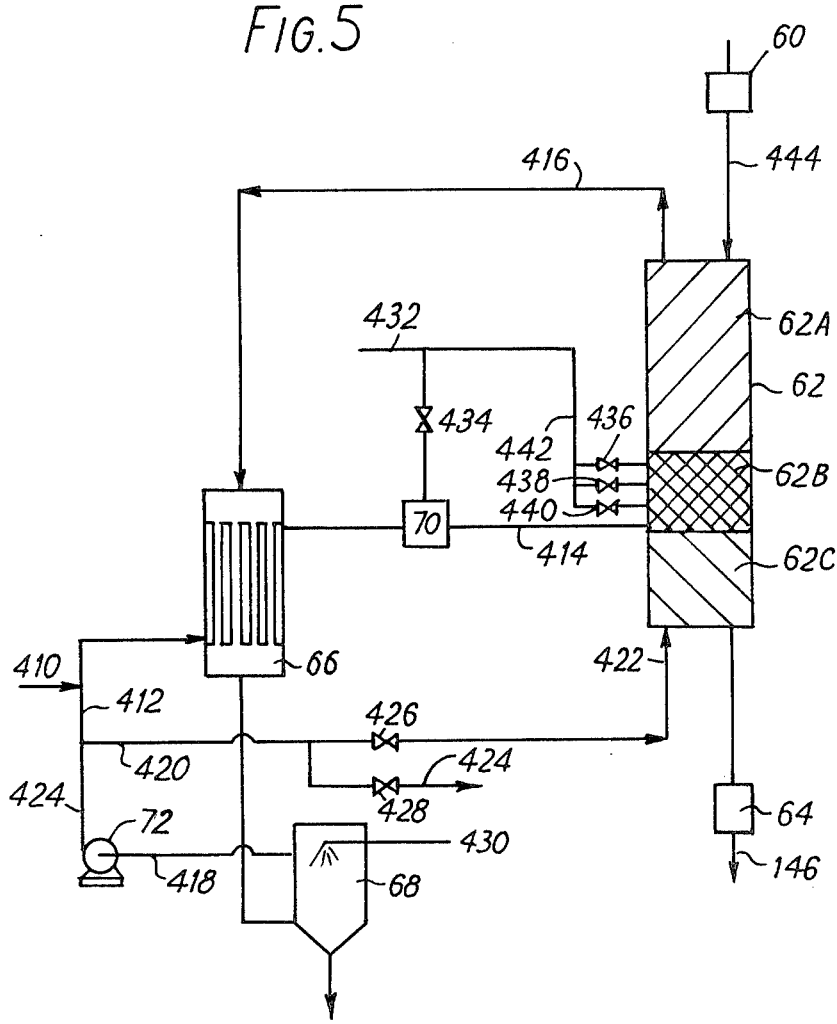
FIG. 5 shows in more detail a preferred arrangement for the ore reduction kiln employed in the arrangement illustrated in FIG. 4.

Referring to FIG. 5, the ore for reduction enters a gas lock system 60 and passes via duct 444 to the kiln 62. In the kiln the ore is heated in preheat zone 62A and reduced in reduction zone 62B by hot hydrogen-containing gases injected into the kiln through tuyere 414 and passing up the kiln, and is progressively reduced to metallized ore. Below the tuyere 414, the metallised ore is further partially reduced and cooled in cooling zone 62C by the cooled hydrogen-containing gas entering the base of the kiln 62 via pipeline 422.

Cooled, metallized, reduced ore is withdrawn from the kiln 62 via a lock system 64 to the discharge shute 446.

Hydrogen entering the ore reduction unit 50 passes via pipeline 410 to the line 412 carrying cooled water-saturated hydrogen gas being recirculated to the kiln 62 through tuyere 414. The combined gas in pipeline 412 enters heat exchanger 66 where it is heated by the countercurrent flow of hot gases leaving the kiln in pipeline 416 and then passes to the preheater unit 70 where air, oxygen-rich air or oxygen is added via pipeline 432 and 434 and used to partially combust the hydrogen-rich gas stream and raise its temperature to between 600° and 1000° C. before passing via the duct or tuyere 414 to a point part way up the kiln 62. Air, oxygen-rich air or oxygen entering the plant via pipeline 432 may also be directed via pipeline 442 and added to the kiln at one or more points above the gas entry duct or tuyere 414. As shown, there are three addition points with valves 436, 438 and 440. Air, oxygen enriched air or oxygen may be added at these points to provide further heat by combustion and assist in counteracting the temperature reduction caused by the endothermic ore reduction reaction. The hot hydrogen-containing gases pass upwards countercurrent to the downward moving ore which is being reduced and the hot gases containing additional water vapor formed by combustion of some of the hydrogen by added oxygen and reduction of the ore, and also carbon dioxide from any carbon monoxide present in the initial hydrogen-rich gas entering in pipeline 410, leaves the kiln via duct 416 and is cooled in heat exchanger 66 before passing to the water wash vessel 68 where the gas is cooled further and excess water vapour condensed and removed by the direct addition of cooling water via pipeline 430.

Cooled, water saturated hydrogen-containing gas leaves the wash vessel 68 via the pipeline 418 to a circulating fan 72. Downstream of the fan 72, a first part of the gas stream passes to line 412 for recirculation to the heat exchanger 66 for reheating and a second part passes to line 420.

A first part of the stream in pipeline 420 is passed via valve 426 and duct 422 to the base of the kiln 62 wherein the gas passes upward through the lower part of the kiln and cools the downward moving reduced ore. At the same time the upflowing gas is heated and further reduces in part some of the hot reduced ore below the duct or tuyere 414. The water vapor content of this gas entering the base of the kiln through pipeline 422 may be controlled so as to pacify the surface of the reduced ore with a thin magnetite layer, thus helping to make the reduced ore more resistant to oxidation and therefore more suitable for storage.

A second part of the gas stream in pipeline 420 is purged from the unit through valve 428 and pipeline 424 in order to purge the build up of carbon oxides resulting from any carbon monoxide contained in the hydrogen rich feed gas and nitrogen and inerts introduced by air leakage and through pipeline 432.

The crude metallic iron formed by the direct reduction of the iron oxide in the kiln unit 50 is passed to arc furnace 52 for refining into steel.

The electricity requirement of the arc furnace is supplied by generator 60 which is driven by the turbine 4 the hot exhaust gases from which provide the heat for the dissociation of the methanol in dissociator 2.

In the embodiment illustrated in the drawings, the steel formed in the arc furnace is then cast into ingots in casting unit 54, re-heated in re-heater 56 and then rolled in rolling mill 58. The entire heat requirement for the re-heater 56 may be provided from the fuel value of the purge gas in line 424 from the ore reduction kiln 62. Also the entire power requirements of the caster 54 and the rolling mill 58 may be provided by the generator 60 which may also provide at least some of the power for ancillary uses such as general services, cranes, oxygen production etc.

As indicated above, the fuel for the turbine 4 is provided through pipeline 450/452 and valve 456 by the carbon monoxide-rich stream recovered from the low temperature separator unit 6.

Some of the dissociated methanol stream recovered from the dissociator 2 may also be used to fuel, or to supplement the fuel to the gas turbine, as may also any methanol stream from separator 6.

Figure 6:
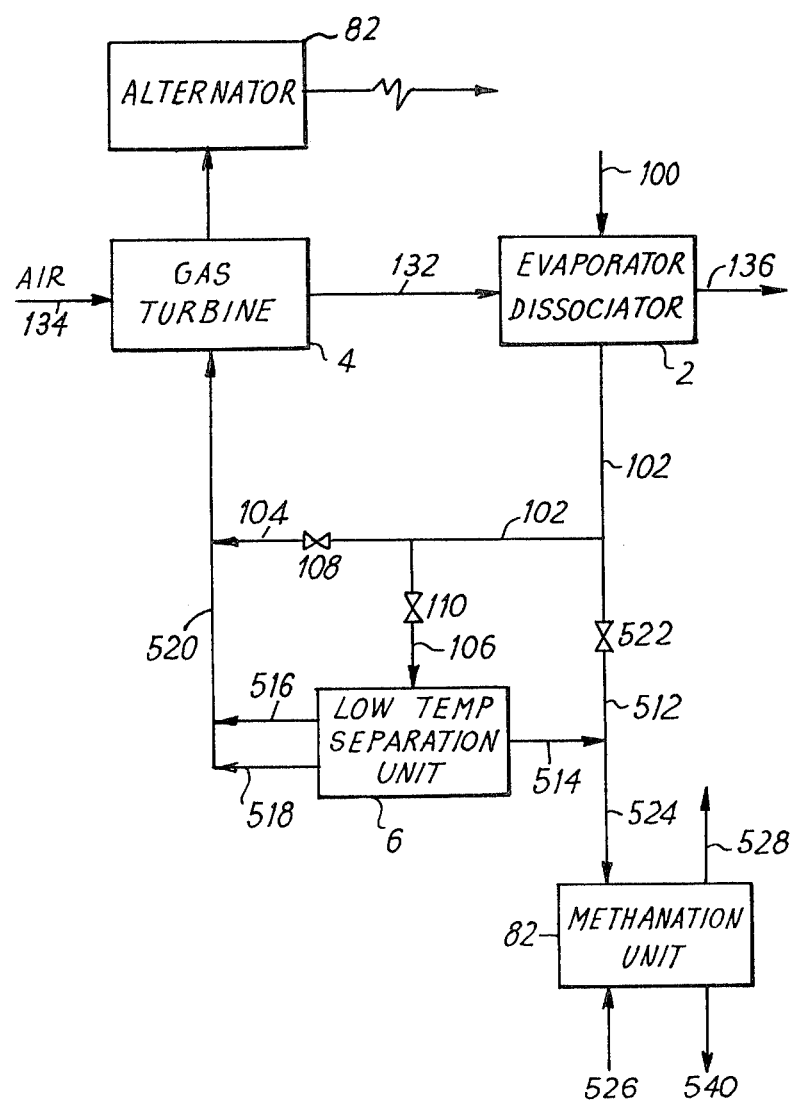
FIG. 6 illustrates a modification of the arrangement of FIG. 1 for the co-production of electrical power and methane gas.
Figure 3:
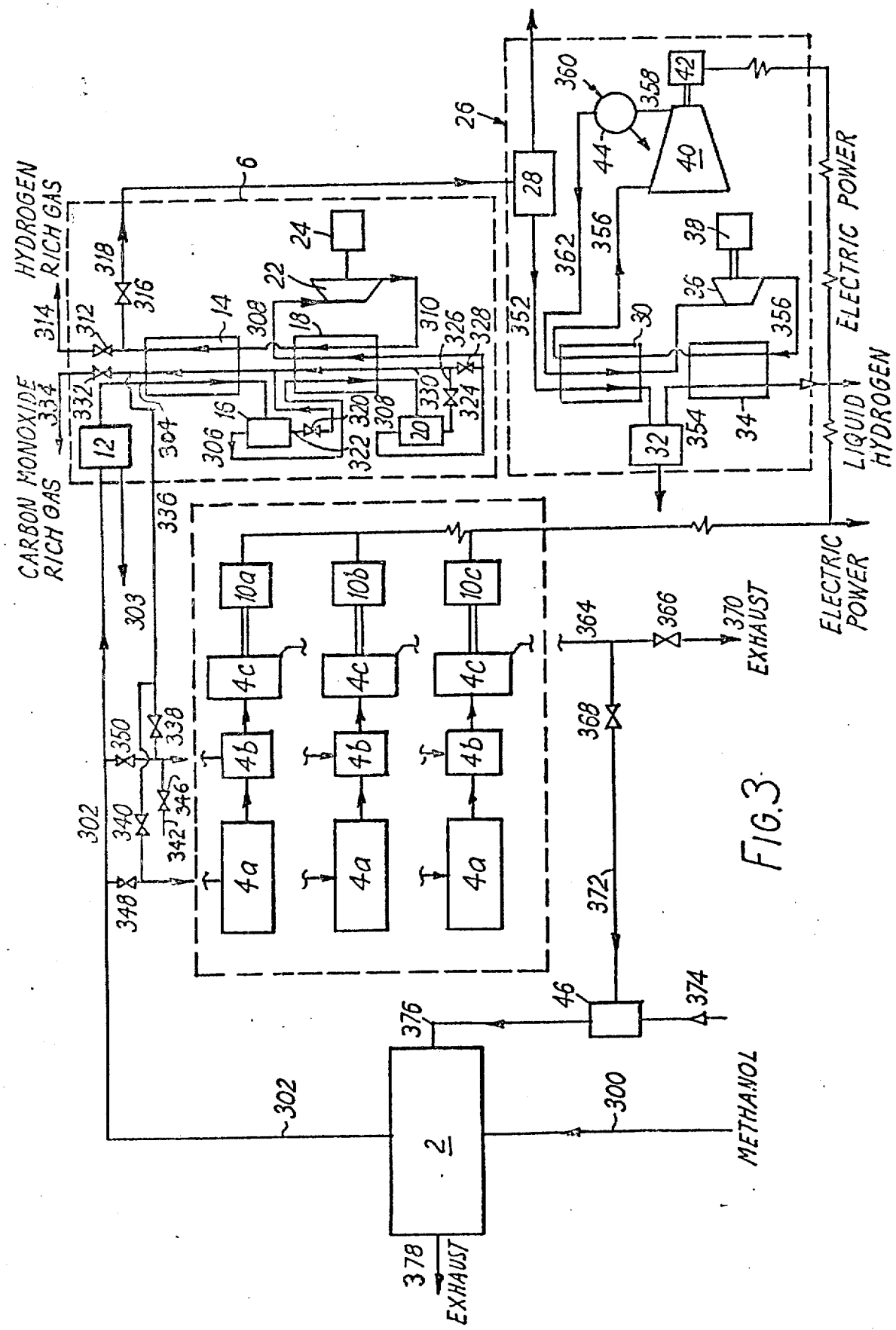
Figure 4:
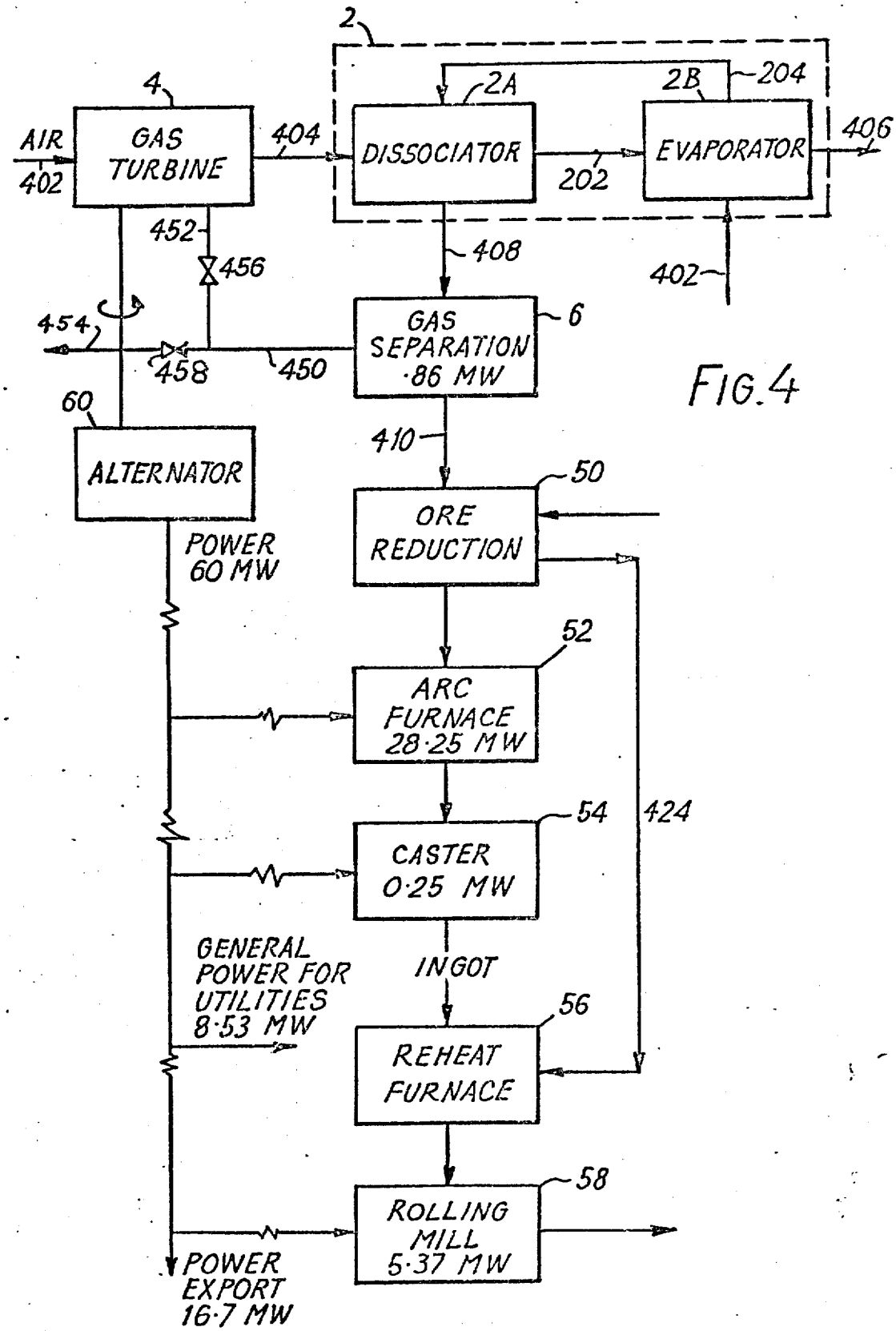

FIG. 6 illustrates the application of the invention to a self-contained arrangement for the conjoint production of electrical power and methane gas. In FIG. 6, the units common to FIGS. 1 and 2 are accorded the same reference numerals. Thus, the arrangement includes a dissociator 2 which is as described above with reference to FIG. 2, a gas turbine 4, a low temperature separator unit 6, a methanation unit 80 and an alternator 82.

As in the arrangement of FIGS. 1 and 2, methanol in pipeline 100 is fed to the dissociator 2 where it is vaporized, superheated and dissociated by heat exchange with exhaust gases from gas turbine 4 which are supplied through pipeline 132 and exhausted to atmosphere through pipeline 136. The dissociated methanol is recovered in pipeline 102. A first part of the gas in pipeline 102 is supplied as part of the fuel to the turbine 4 through pipeline 104 and valve 108. A second part is fed to the low temperature separation unit 6 via pipeline 106 and valve 110 and a third part is supplied via valve 522 to pipeline 512 for subsequent use as described below. The low temperature separation unit 6, which divides the dissociated methanol in pipeline 106 by multi-stage partial condensation at cryogenic temperatures into a first stream which contains readily condensible materials, primarily $CO_2$ and methanol, and which is recovered through pipeline 516, a second stream which is mainly carbon monoxide and is recovered through pipeline 518 and a third stream which is mainly hydrogen and which is recovered through pipeline 514. The manner of operating the unit to recover these streams is well known and does not form any part of this invention and may be e.g. as shown in FIG. 3.

The methanol-containing stream in pipeline 516 and the carbon monoxide-rich stream in pipeline 518 are combined in pipeline 520 and fed into the dissociated methanol stream in pipeline 104 to form the fuel for the gas turbine 4. The hydrogen-rich stream in pipeline 514 is combined with the dissociated methanol stream in pipeline 512 and the flows in pipelines 106 and 512 and the conditions of the low temperature separator unit are adjusted so that the product of combining the streams in pipelines 512 and 514 has a $CO:H_2$ ratio of about 1:3. This stream is fed in pipeline 524 to methanation plant 80 where it is reacted under known conditions in the presence of water and a methanation catalyst at elevated temperature to produce methane in accordance with the reaction $$CO + 3H_2 \rightarrow CH_4 + H_2O$$

A methane-containing stream is recovered through pipeline 540 and low pressure steam is recovered through pipeline 528.

The gas turbine 4 drives an electricity generator 82 and the power requirements of the low temperature separator unit 6 and the methanation unit 80 can be provided from this generator, leaving a net excess of electrical power available for export. There is thus provided a self-contained plant for the joint production of methane gas and electricity from methanol.

Whereas the above embodiments have been described with reference to the use of substantially pure methanol, commercial grades of methanol containing impurities commonly associated therewith may be used.

Where the methanol contains water, the carbon monoxide produced by dissociation of the methanol may enter into a shift reaction with the water at the dissociation temperature, in accordance with the endothermic reaction $$CO + H_2O \rightarrow H_2 + CO_2$$

thereby increasing the hydrogen content of the dissociated gas. It may be desirable to add water or steam either to the methanol or to the dissociated gas stream to further increase hydrogen production. However, this will also increase the carbon dioxide content and while this may be advantageous where it is desired to obtain a $CO_2$-containing process stream, it will reduce the fuel value of the gas mixture and will not normally be desirable where the dissociated gas is intended to be used as a source of fuel gas.

If large amounts of steam or water are introduced, substantially all the carbon monoxide produced by disassociation of the methanol may be converted to carbon dioxide by reaction with the water and the separation will then be essentially of carbon dioxide from hydrogen.

Whereas the above discussion relating to the inclusion of water suggests that this reacts with the carbon monoxide, it is also possible that the reaction of the water may be with the methanol itself, in accordance with the equation $$CH_3OH + H_2O \rightarrow 3H_3 + CO_2$$

It is also to be noted that methanol may contain other impurities such as higher alcohols and dimethylether. Higher alcohols may be removed by distillation for separate sale rather than be used as fuel. However, if left in the methanol these impurities will decompose in combination with water in the methanol to carbon monoxide and hydrogen. It may be desirable therefore, if the methanol contains high concentrations of higher alcohols and dimethylether and a low water content, to add some water to assist their decomposition.

Whereas it is possible with certain catalysts and certain materials of construction for the dissociator and downstream of the dissociator that some methanation may occur, and this is not disadvantageous in most circumstances, if desired steps can be taken to suppress it, e.g. by avoiding the presence of Group VIII metals and their oxides in the dissociation and subsequent hot gas zones. For the purposes of the following Examples it has been assumed that no significant methanation has taken place.

EXAMPLE 1

This Example demonstrates the application of the invention to increasing the efficiency of fuel utilisation in a turbine. By way of an example using the arrangement of FIG. 2, from a supply of methanol contaminated with 2 mol % water impurity at 64750 lbs/hr and a pressure such as to provide vapor at 18.8 atmospheres in pipeline 204, a power output of 60 MW can be obtained from an alternator driven by the gas turbine, corresponding to a consumption of 1079 lb/hr of methanol per MW.

The flows of the various pipelines are tabulated below.

| Pipeline | Composition | Flow Rate (lbs/hr) | Temp | Pressure (atm abs) |
|---|---|---|---|---|
| 100 | liquid methanol | 64750 | Ambient | about 19.2 |
| 204 | methanol vapor | 64750 | 210° C. | 19.0 |
| 102 | 95% dissociated methaol | 64750 | 387° | 18.8 |
| 132 | exhaust gas | 3.213 × 10$^6$ | 450° C. | — |
| 202 | exhaust gas | 3.213 × 10$^6$ | 359° C. | — |
| 136 | exhaust gas | 3.213 × 10$^6$ | 323° C. | — |

The power for pumping the methanol to the required pressure is only a fraction of a MW and can be supplied by the alternator.

By way of comparison, if the evaporator and dissociator are removed and the turbine is supplied with liquid methanol and the exhaust gas is vented direct to atmosphere, 76080 lb/hr of methanol are required for an output of 60 MW, corresponding to 1268 lb/hr of methanol per MW. The net efficiency increase is thus 17.5%.

EXAMPLE 2

This Example serves to illustrate how about 60 MW of power and a process stream containing about 2800 Kg/hr of hydrogen can be produced from a self-contained plant in accordance with the invention.

Referring to the arrangement shown in FIG. 1, 52368 Kg/hr of liquid methanol containing 601 Kg/hr of water (2 mol %) as an impurity is fed to the dissociator 2 at ambient temperature and elevated pressure. The dissociator is of the kind illustrated in FIG. 2 and the methanol is vaporized and heated in evaporator/superheater 2A to 210° C. and thereafter simultaneously heated to 387° C. and 95% dissociated in dissociator 2A. The methanol liquid is supplied to the unit 2 at a pressure such that the 95% dissociated methanol recovered from the dissociator at 387° C. in line 102 is at a pressure of 18.8 atmospheres absolute. The dissociated methanol in line 310 comprises 42597 Kg/hr CO, 6285 Kg/hr H$_2$, 2618 Kg/hr CH$_3$OH and 1469 Kg/hr CO$_2$. The CO$_2$ is formed by reaction of the water contained in the methanol with CO as described above.

Approximately 55.5% of the stream in pipeline 102 is passed via pipeline 104 and valve 108 to fuel the gas turbine, leaving 44.5% providing 2797 Kg/hr of H$_2$ available in line 106 as a process or fuel gas for export. As the gas in line 106 is disassociated methanol which has not been modified in any manner, it will be understood that it comprises 44.5% of the net calorific value of the disassociated methanol.

Exhaust gases from the gas turbine are passed to the dissociator 2A at 450° C., recovered therefrom at 286° C. and thence passed through the evaporator/superheater from which they were exhausted to atmosphere at 220° C.

The gas turbine (33% efficient) drives a generator (95% efficient) not shown, which provides 60 MW power for export. A small proportion of this power (0.12 MW) can be used to pump the methanol feed to the plant to the required pressure.

EXAMPLE 3

The process stream in pipeline 106 of Example 2 above is separated in low temperature separator unit 6 (FIG. 1) into a hydrogen-rich stream and a carbon monoxide-rich stream. The process stream is at sufficiently high pressure (18.8 atmospheres absolute) for all the cold requirement for separation by cryogenic partial condensation to provide a 95% pure hydrogen stream to be supplied by work expansion of the hydrogen-rich stream obtained from the separation. In this manner a 95% pure hydrogen stream can be recovered from the process stream. The power for any ancillary services can, if desired, also be provided by the generator. Separator unit 6 may be e.g. as shown in FIG. 3.

EXAMPLE 4

Figure 3:
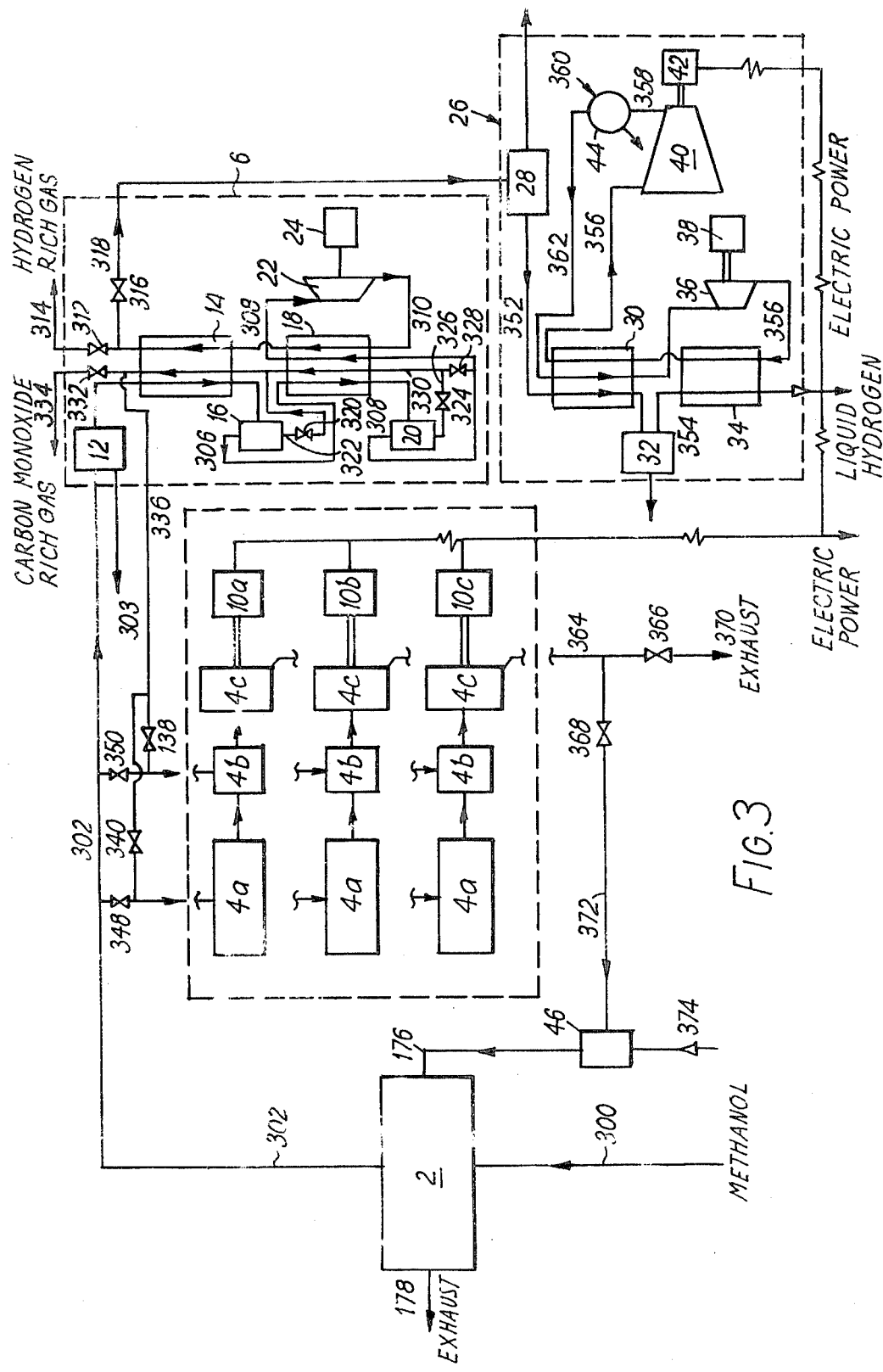
FIG. 3 is a flow sheet showing one manner of employing the invention for the production of liquid hydrogen.

This Example illustrates how the process as illustrated in FIG. 3 may be employed to produce approximately 4500 Kg/hr of liquid hydrogen. 50679 Kg/hr of liquid methanol containing 5 mol % water are supplied through pipeline 300 at 19 atmospheres absolute and ambient temperature. The methanol is heated to 393° C. and 95% dissociated in dissociator 2 and is recovered therefrom at 18.8 atmospheres absolute pressure. It is then passed to the dissociated gas purification unit 12 which in this example comprises (a) a four stage exchanger where the gas is cooled to −30° C. and partially condensed, (b) a gas/liquid separator, and (c) an adsorber for any remaining methanol and carbon dioxide from the gas recovered from the separator. The four stages of the heat exchanger are cooled, respectively, by the liquid methanol feed to the dissociator, cold water, the gas recovered from the gas/liquid separator prior to passing it to the adsorber, and a closed circuit refrigerator.

The gas from the purification unit is passed at −30° C. to the low temperature part of unit 6 which is arranged to produce a 95% pure hydrogen gas stream in pipeline 318 comprising 4518 Kg/hr of H$_2$ and 3329 Kg/hr of CO. The carbon monoxide is removed from the gas in purification units 28 and 32 and the resultant hydrogen, which comprises substantially all the hydrogen in pipeline 318, is liquefied and recovered from liquefaction unit 26 in pipeline 354 as liquid hydrogen.

A first stream formed by combining the condensates recovered from the gas/liquid separators 16 and 20 and the by-product streams from the purification units 28 and 32 (after these have been used as a purge gas for the adsorber unit in purification unit 12, as described below) and a second stream comprising the condensate from the gas/liquid separator in purification unit 12, are combined to provide a fuel stream for the gas turbine comprising 2535 Kg/hr of $CH_3OH$, 3764 Kg/hr of $CO_2$, 40291 Kg/hr of CO and 1859 Kg/hr of $H_2$, the stream being at 16 atmospheres absolute. This stream is combusted in the turbine (33% thermal efficiency) to yield an exhaust gas which is supplied at 450° C. to the dissociator and exhausted therefrom at 239° C.

The power requirements of 57.4 MW for the hydrogen purification and liquefaction plant and 0.61 MW for the refrigeration plant in purification unit 12 are supplied from the gas turbine which also provides through an alternator (95% efficient) a surplus of 2.47 MW. The power for pumping the methanol feed to 19 atmospheres can readily be supplied, if desired, from this surplus.

The purge gas for the adsorber in purification unit 12 is provided by a portion of said first stream referred to above. This purge gas stream is heated by heat exchange with exhaust gas at 239° C. exhausted from the dissociator and after passage through the adsorber unit is recombined with said first stream before said stream is combined with said second stream to form the fuel for the gas turbine.

EXAMPLE 5

This Example illustrates the application of the process described with reference to FIGS. 4 and 5 to the production of 440,000 tons/year of rolled steel product from iron ore (assuming 330 working days/year). 53431 Kg/hr of methanol containing 5 mol % (1573 Kg/hr) of water as an impurity is supplied through pipeline 402 and 95% dissociated in dissociator 2. The dissociated gas is separated in known manner by low temperature separation to provide (a) a 95% pure hydrogen stream containing 4751 Kg/hr of hydrogen, and a fuel stream in pipeline 452 for the turbine containing 2672 Kg/hr $CH_3OH$, 3861 Kg/hr $CO_2$, 38611 Kg/hr CO and 2033 Kg/hr $H_2$. 79187 Kg/hr of $Fe_2O_3$ as iron ore were fed at ambient temperature to the ore reduction plant 50 where it was heated to 800° C. by combustion of a part of the hydrogen gas supplied to the plant and reduced by uncombusted hydrogen and eventually withdrawn from the bottom of the kiln at 60° C. as 55386 Kg/hr of iron sponge for processing in the arc furnace, caster, reheater furnace and rolling mill in conventional manner to produce the rolled steel.

The compositions and flow rates of the various gas streams associated with the ore reducer are set out below. For simplicity, it is assumed that the $H_2$ is 100% pure and that the oxygen is supplied pure. In fact however, the hydrogen contains about 5 mol % carbon monoxide and it is generally preferred to supply the oxygen as air. Thus the circulating streams will also contain nitrogen and oxides of carbon. If desired, however, hydrogen which is almost CO-free may be obtained by means of a low temperature propane or nitrogen wash or other established adsorption techniques.

| Pipeline | Flow Rate (Kg/hr) $H_2$ | $H_2O$ | $O_2$ | Temperatures (°C.) |
|---|---|---|---|---|
| 410 | 4715 | — | — | 15.5 |
| 414 | 14566 | 12971 | — | 597 |
| 416 | 12813 | 49421 | — | 619 |
| 418 | 12813 | 16694 | — | 50 |
| 422 | 2017 | 2516 | — | 50 |
| 424 | 986 | 1207 | — | 50 |
| 432 | — | — | 6363 | 15.5 |

The stream in pipeline 424 is passed to be combusted in the reheat furnace 56.

The fuel provided in pipeline 452 is combusted in gas turbine 4 (33% efficient) and the exhaust gases from the turbine are supplied to the dissociator 2 at 450° C. and recovered therefrom at 239° C.

The power requirements of the various units are as follows

| Low temperature separation | 0.86 MW |
|---|---|
| Arc Furnace 52 | 28.25 MW |
| Caster 54 | 0.25 MW |
| Rolling Mill 32 | 5.37 MW |
| General Utilities | 8.53 MW |
| Total | 42.36 |

The gas turbine is used to drive an electricity generator 36 which at 95% efficiency produces 60 MW power, thus leaving approximately 16.7 available for export.

The value of 0.86 MW is for the external refrigeration requirements, it being assumed that the remaining energy is provided by work-expanding previously compressed dissociated methanol. The energy for supplying the dissociated methanol at the required pressure can readily be supplied from the surplus available power, this power being only a fraction of a megawatt.

EXAMPLE 6

In a specific Example illustrating the process described with reference to FIG. 6, methanol containing 2 mole % water as an impurity is supplied at ambient temperature and an elevated pressure and a flow rate such as to give, after dissociation, a stream having the following composition and at 18.8 atmospheres absolute pressure.
CO: 42597 Kg/hr
$H_2$: 6285 Kg/hr
$CH_3OH$: 2618 Kg/hr
$CO_2$: 1469 Kg/hr This stream which is recovered at a temperature of 387° C. is then divided to give a ratio of the combined flow rate in pipelines 104 and 106 to the flow rate in pipeline 512 of 2.101:1 and a ratio of flow rates in pipelines 104 and 106 of 2.1255:1.

The compositions, flow rates (Kg/hr), temperatures and pressures of the various streams arising from this arrangement are as follows

| Pipeline | CO | $H_2$ | $CH_3OH$ | $CO_2$ | Temp (°C.) | Pressure (atm gauge) |
|---|---|---|---|---|---|---|
| 104 | 19627 | 2774 | 1206 | 622 | 387 | 16 |
| 106 | 9234 | 1305 | 568 | 318 | 387 | 18.8 |
| 512 | 13736 | 2206 | 844 | 474 | 387 | 18.8 |
| 514 | 1756 | 1294 | nil | nil | ambient | atmospheric |
| 520 | 7478 | 11 | 568 | 318 | n.d | 16 |
| 520 + 104 | 27105 | 2785 | 1774 | 995 | n.d | 16 |
| 524 | 15492 | 3500 | 844 | 474 | n.d | atmospheric |

The methanation requires 84,270 Kg/hr of boiler feed water at 156° C. and produces 39680 Kg/hr of low pressure steam and a methane product stream of 9853 Kg/hr $H_2O$, 8970 Kg/hr $CH_4$, 310 Kg/hr CO, 123 Kg/hr $H_2$ and 1054 Kg/hr $CO_2$.

The pressure at which the methanol is supplied is sufficiently high at 19 atmospheres to provide all the energy for the low temperature separation and the methanation is exothermic and requires little or no energy input. Under these conditions, the gas turbine driven electricity generator will provide approximately 60 MW net available for export.

All the heat for the dissociation of the methanol is supplied from the hot exhaust gases from the turbine which are supplied to the dissociator at 450° C. and exhaust therefrom at about 215°-220° C.

While in the embodiments of the invention described above the fuel for the gas turbine has been entirely supplied from dissociated methanol (either as such or in the form of products separated from it), it is to be understood that other fuels may be used in admixture with the dissociation methanol or products obtained therefrom, e.g. butane.

However, it will be understood that the benefits obtainable from the invention are increased where the dissociated methanol provides a major part or substantially all of the fuel supply to the gas turbine.

To avoid accidentally overheating the catalyst in the dissociator, it may be desirable to provide thermostatically controlled means for bypassing turbine exhaust gases around the dissociator.

Gas turbines operating in accordance with the invention may be started up using liquid methanol or a conventional hydrogen fuel.

If desired, any carbon dioxide contained in the dissociated gas may be removed in known manner by scrubbing with methanol. Carbon dioxide thus removed, which may contain some methanol vapor, may be injected into the combustion air intake of the gas turbine and due to the excess air requirements of the turbine, the contained methanol may be effectively combusted without adversely affecting turbine performance.

I claim:

1. A process for providing from methanol both power and a process or fuel gas comprising carbon monoxide and hydrogen, the process comprising at least partially disssociating the methanol into carbon monoxide and hydrogen by contacting said methanol at elevated temperature with a catalyst for the dissociation which is selected from catalysts for the reverse reaction of forming methanol from carbon monoxide and hydrogen, and providing said process or fuel gas from a first part of the at least partially dissociated methanol, energy for the dissociation being provided from the heat in the hot gases of combustion from a gas turbine fueled by a second part of the at least partially dissociated methanol.

2. A process as claimed in claim 1 in which all the energy for dissociation is provided for the heat in the hot gases of combustion.

3. A process as claimed in claim 2 in which at least a portion of the at least partially dissociated methanol is separated into at least one carbon monoxide-rich stream and at least one hydrogen-rich stream.

4. A process as claimed in claim 3 in which at least a part of the energy required for the separation is provided as mechanical energy by combustion in prime mover means of a fuel provided from at least partially dissociated methanol.

5. A process as claimed in claim 4 in which said prime mover means consists of or includes said gas turbine.

6. A method as claimed in claim 4 in which the separation involves cryogenic partial condensation and at least a part of the energy for the separation is supplied by providing the at least partially disassociated methanol at elevated pressure and subsequently work-expanding it.

7. A process as claimed in claim 1 in which said process or fuel gas is utilized in an energy consuming process and at least part of the energy for said energy-consuming process is provided by combustion of a fuel provided from said at least partially disassociated methanol.

8. A process as claimed in claim 7 in which the energy is provided at least in part as mechanical energy by combustion of said fuel in prime mover means.

9. A process as claimed in claim 8 in which the prime mover means consists of or includes said gas turbine.

10. A process as claimed in claim 3 in which liquefied hydrogen is derived from a hydrogen-rich stream obtained by said separation and at least part of the energy for the liquefaction is provided by the combustion of a fuel provided from the at least partially dissociated methanol.

11. A process as claimed in claim 3 in which the separation is conducted to obtain a process stream containing carbon monoxide and hydrogen and the carbon monoxide and hydrogen in said process stream are reacted together in a known manner to form methane.

12. A process as claimed in claim 3 in which a process stream containing carbon monoxide and hydrogen is formed by combining at least one stream derived from the carbon monoxide-rich and hydrogen-rich streams resulting from the separation with at least one stream selected from another portion of said at least partially dissociated methanol and at least one other stream derived from said carbon monoxide-rich and hydrogen-rich streams and the carbon monoxide and the hydrogen in said process stream are thereafter reacted together in a known manner to form methane.

13. A process as claimed in claim 1 in which the catalyst for the dissociation is selected from the group consisting of zinc-containing catalysts for the formation of methanol from carbon monoxide and hydrogen.

14. A process as claimed in claim 1 wherein said process or fuel gas so provided comprises a substantial portion of the calorific value of the dissociated methanol.

15. A process as claimed in claim 1 wherein said process or fuel gas so provided comprises at least about 12% by weight of the dissociated methanol.

* * * * *

UNITED STATES PATENT AND TRADEMARK OFFICE
CERTIFICATE OF CORRECTION

Figure 4:
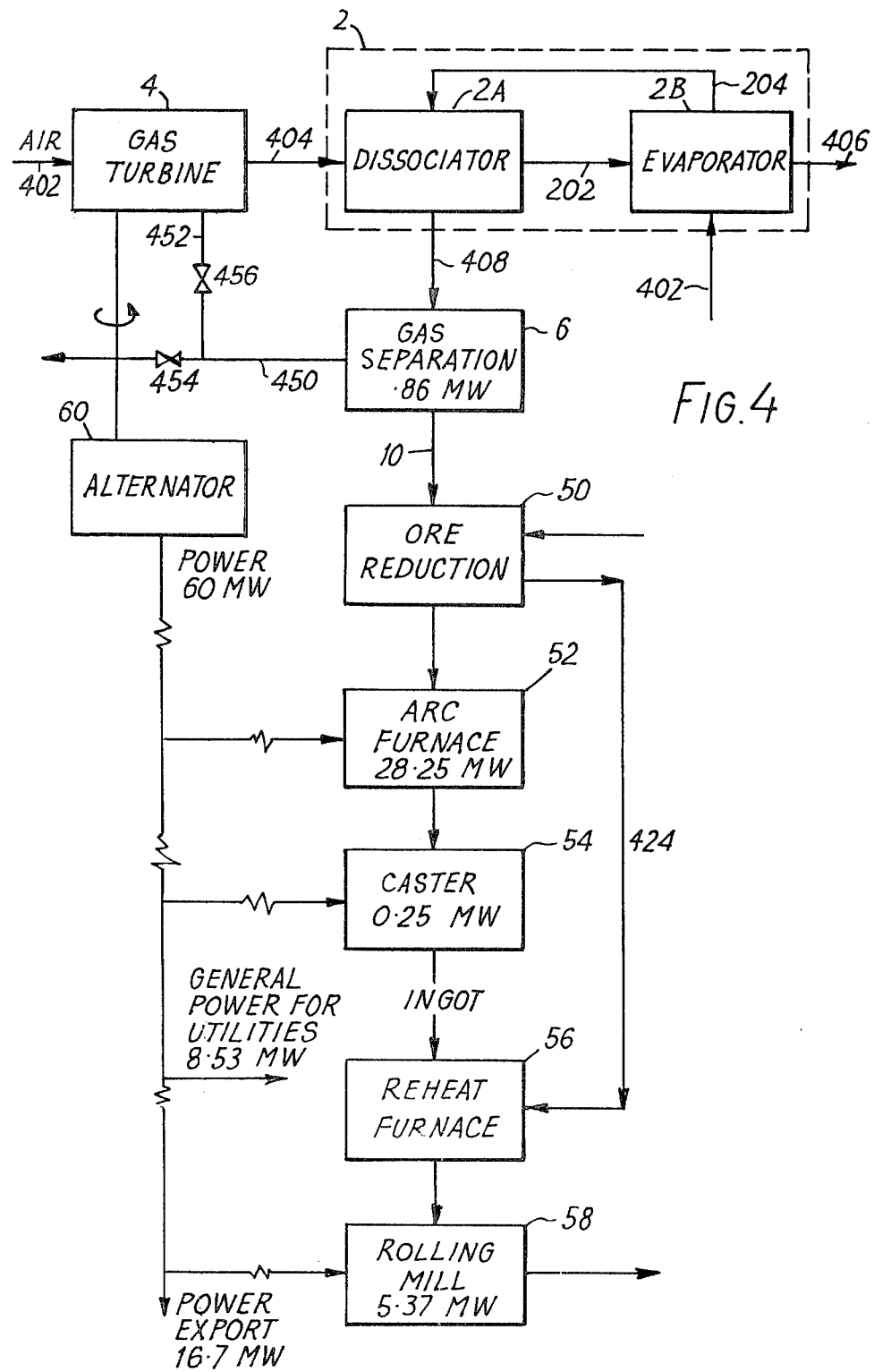
FIG. 4 is a flow sheet illustrating the application of the process of the invention to the production of rolled steel products.

PATENT NO. : 4,185,456
DATED : January 29, 1980
INVENTOR(S) : Donald R. CUMMINGS It is certified that error appears in the above-identified patent and that said Letters Patent are hereby corrected as shown below:

```
Column  8, line 22, change "2B"  to --2A--
           line 31, change "2B"  to --2A--
           line 62, change "100" to --110--
Column 10, line 42, change "332" to --322--
Column 11, line 58, change "164" to --364--
Column 13, line 26, change "108" to --408--
Column 17, line 56, change "2A"  to --2B--
           line 62, change "310" to --102--
Column 20, line 19, change "36"  to --60--
Figure  1, change "213" to --2B--
Figure  3, substitute this figure as per attached new Figure 3
Figure  4, substitute this figure as per attached new Figure 4
Figure  5, change "146" to --446--
Figure  6, change "82"  to --80--
```

Signed and Sealed this

Twenty-sixth Day of August 1980

[SEAL]

Attest:

SIDNEY A. DIAMOND

*Attesting Officer*   *Commissioner of Patents and Trademarks*